United States Patent [19]
Kim

[11] Patent Number: 5,608,704
[45] Date of Patent: Mar. 4, 1997

[54] CONTROL METHOD FOR RESTORING UNUSABLE AREA OF DISK

[75] Inventor: Jong-woon Kim, Suwon, Rep. of Korea

[73] Assignee: Samsung Electronics Co., Ltd., Kyungki-do, Rep. of Korea

[21] Appl. No.: 498,918

[22] Filed: Jul. 6, 1995

[30] Foreign Application Priority Data

Jul. 7, 1994 [KR] Rep. of Korea .................. 94-16790

[51] Int. Cl.$^6$ ............................................. G11B 7/00
[52] U.S. Cl. ............................ 369/56; 369/54; 369/58
[58] Field of Search ........................... 369/32, 54, 58, 369/44.26, 59, 86, 60, 48, 47

[56] References Cited

U.S. PATENT DOCUMENTS

| | | | |
|---|---|---|---|
| 4,996,678 | 2/1991 | Maeda | 369/32 |
| 5,420,838 | 5/1995 | Maeda et al. | 369/68 |
| 5,434,991 | 7/1995 | Maeda et al. | 369/32 |

*Primary Examiner*—Nabil Hindi
*Attorney, Agent, or Firm*—Sughrue, Mion, Zinn, Macpeak & Seas

[57] ABSTRACT

A method for restoring an unused area of a disk using a disk play is provided. The method includes the steps of: erasing the data of an arbitrary track and continuously shifting the data of the next track to the empty track; reforming a UTOC related with the erased and shifted tracks; reforming again track information by combining the last empty track and an unused area after the data is shifted to the last track; and recording the reformed UTOC in the disk. Therefore, the unused area generated due to the limitation of track information provided from the UTOC can be used for re-recording, so that the disk can be used more efficiently.

2 Claims, 7 Drawing Sheets

FIG. 1A
(PRIOR ART)

| TRACK 1 | TRACK 2 | TRACK 3 | TRACK 4 |

FIG. 1B
(PRIOR ART)

| TRACK 1 | TRACK 2 | TRACK 3 | TRACK 4 | TRACK 5 | TRACK 6 | TRACK 7 | TRACK 8 |

FIG. 1C
(PRIOR ART)

| // | TRACK 1 | // | TRACK 2 | // | TRACK 3 | // | TRACK 4 |

FIG. 2A (PRIOR ART)

REMARK : BIT ORDER FOR SCRAMBLING IS SAME AS CD-ROM

| | 1 | 2 | 3 | 4 | |
|---|---|---|---|---|---|
| | ←16 BIT EVEN m→ | | ←16 BIT ODD m→ | | |
| | MSB    LSB | MSB    LSB | MSB    LSB | MSB    LSB | |
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | CLUSTER H | CLUSTER L | 00000000 | 00000000 | |
| 4 | 00000000 | 00000000 | 00000000 | 00000000 | DATA AREA(2336 BYTE) |
| 5 | 00000000 | 00000000 | 00000000 | 00000000 | |
| 6 | 00000000 | 00000000 | 00000000 | 00000000 | |
| 7 | MAKER CODE | MODEL CODE | FIRST TNO [01] | LAST TNO [FF] | |
| 8 | 00000000 | 00000000 | 00000000 | USED SECTORS | |
| 9 | 00000000 | 00000000 | 00000000 | 00000000 | |
| 10 | 00000000 | 00000000 | 00000000 | DISCSERIAL NO | |
| 11 | DISC | ID | P-DFA | P-EMPTY [00] | |
| 12 | P-FRA [00] | P-TNO 1 [02] | P-TNO 2 [03] | P-TNO 3 [04] | |
| ⋮ | ⋮ | ⋮ | ⋮ | ⋮ | |
| 75 | P-TNO 252 [FD] | P-TNO 253 [FE] | P-TNO 254 [FF] | P-TNO 255 [01] | |
| 76 | 00000000 | 00000000 | 00000000 | 00000000 | |
| 77 | 00000000 | 00000000 | 00000000 | 00000000 | |
| 78 | START ADDRESS | [04F6 00 00] | | TRACK MODE [86] | |
| 79 | END ADDRESS | [04FB 1F 0A] | | LINK-P [00] | |
| 80 | START ADDRESS | [0032 00 00] | | TRACK MODE [86] | |
| 81 | END ADDRESS | [0037 1F 0A] | | LINK-P [00] | |
| 82 | START ADDRESS | [0038 00 00] | | TRACK MODE [86] | |
| 83 | END ADDRESS | [003D 1F 0A] | | LINK-P [00] | |
| ⋮ | ⋮ | | | ⋮ | |
| 586 | START ADDRESS | [04F1 00 00] | | TRACK MODE [86] | |
| 587 | END ADDRESS | [04F5 1F 0A] | | LINK-P [00] | |

(X4 BYTE)

FIG. 2B (PRIOR ART)

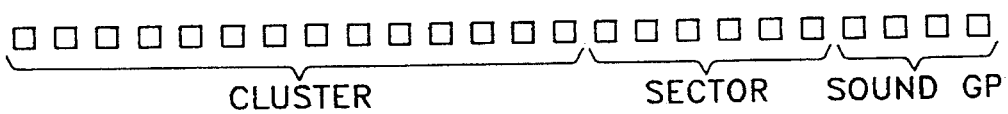

CLUSTER   SECTOR   SOUND GP

FIG. 8

| | MSB　　　　LSB | | | |
|---|---|---|---|---|
| 7 | MAKER CODE | MODEL CODE | FIRST TNO [01] | LAST TNO [FF] |
| 8 | 00000000 | 00000000 | 00000000 | USED SECTORS |
| 9 | 00000000 | 00000000 | 00000000 | 00000000 |
| 10 | 00000000 | 00000000 | 00000000 | DISCSERIAL NO |
| 11 | DISC — ID | | P-DFA | P-EMPTY [00] |
| 12 | P-FRA [03] | P-TNO 1 [02] | P-TNO 2 [04] | P-TNO 3 [05] |
| 75 | P-TNO 252 [FE] | P-TNO 253 [FE] | P-TNO 254 [01] | P-TNO 255 [XX] |
| 76 | 00000000 | 00000000 | 00000000 | 00000000 |
| 77 | 00000000 | 00000000 | 00000000 | 00000000 |
| 78 | START ADDRESS | | [04F6 00 00] | TRACK MODE [86] |
| 79 | END ADDRESS | | [04FB 1F 0A] | LINK-P [00] |
| 80 | START ADDRESS | | [0032 00 00] | TRACK MODE [86] |
| 81 | END ADDRESS | | [0037 1F 0A] | LINK-P [00] |
| 82 | START ADDRESS | | [0038 00 00] | TRACK MODE [86] |
| 83 | END ADDRESS | | [003D 1F 0A] | LINK-P [00] |
| 586 | START ADDRESS | | [04F1 00 00] | TRACK MODE [86] |
| 587 | END ADDRESS | | [04F5 1F 0A] | LINK-P [00] |

X4 BYTE

FIG. 9

| | MSB    LSB | | | |
|---|---|---|---|---|
| 7 | MAKER CODE | MODEL CODE | FIRST TNO [01] | LAST TNO [FF] |
| 8 | 00000000 | 00000000 | 00000000 | USED SECTORS |
| 9 | 00000000 | 00000000 | 00000000 | 00000000 |
| 10 | 00000000 | 00000000 | 00000000 | DISCSERIAL NO |
| 11 | DISC – ID | | P–DFA | P–EMPTY [00] |
| 12 | P–FRA [03] | P–TNO 1 [02] | P–TNO 2 [04] | P–TNO 3 [05] |
| | ≀ | ≀ | ≀ | ≀ |
| 75 | P–TNO 252 [FE] | P–TNO 253 [FE] | P–TNO 254 [01] | P–TNO 255 [XX] |
| 76 | 00000000 | 00000000 | 00000000 | 00000000 |
| 77 | 00000000 | 00000000 | 00000000 | 00000000 |
| 78 | ⌈START ADDRESS [04F6 00 00] | | | TRACK MODE [86] |
| 79 | ⌊END ADDRESS [04FB 1F 0A] | | | LINK–P [00] |
| 80 | ⌈START ADDRESS [0032 00 00] | | | TRACK MODE [86] |
| 81 | ⌊END ADDRESS [0037 1F 0A] | | | LINK–P [00] |
| 82 | ⌈START ADDRESS [READ END ADDRESS+1] | | | TRACK MODE [86] |
| 83 | ⌊END ADDRESS [READ OUT ADDRESS–1] | | | LINK–P [00] |
| | ≀ | | | ≀ |
| 586 | ⌈START ADDRESS [04F1 00 00] | | | TRACK MODE [86] |
| 587 | ⌊END ADDRESS [04F5 1F 0A] | | | LINK–P [00] |

X4 BYTE

CONTROL METHOD FOR RESTORING UNUSABLE AREA OF DISK

BACKGROUND OF THE INVENTION

The present invention relates to a disk player, and more particularly, to a method for restoring an unused area so as to reuse the unused area which is generated during the recording or editing of a mini disk player.

First, the unused area of the disk, generated when a conventional mini disk player edits the tracks, will be described below.

FIG. 1A shows the distribution of four tracks when the tracks are fully recorded. When the four tracks are edited, tracks 1, 3, 5 and 7 are generated as shown in FIG. 1B. Even though tracks 1, 3, 5 and 7 are erased for recording data as shown in FIG. 1C, the tracks remain as an unused area due to the small recording capacity thereof.

That is, since the unused tracks such as tracks 1, 3, 5 and 7 increase during the conventional track editing process, the amount of the recordable tracks per total number of tracks decreases.

On the other hand, the mini disk player records the data in the disk using a user table of contents (UTOC) shown in FIG. 2A. Referring to FIG. 2A, the byte position from a pointer's value P (decimal) is calculated using the following formula:

$$76 \times 4 + P \times 8$$

Here, P-DFA represents the pointer for the start address of the defective area, P-EMPTY represents the pointer for the first empty slot on the parts table, P-FRA represents the pointer for the start address of the freely recordable area, and P-TNO n represents the pointer for the start address of track n. Start and end addresses are classified into a 14-bit cluster, a 6-bit sector and a 4-bit sound group.

Track mode represents the mode while the track is used, and LINK-P represents the byte position that gives the next part-descriptor of the same track. If the value of LINK-P is 00h, the track ends with the end address. The byte position of the next part-descriptor is calculated as $76 \times 4 + (\text{LINK-P}) \times 8$.

The pointer value of FIG. 2A should be a hexadecimal number and LINK-P of the above formula should be a decimal number. Also, the part-descriptor corresponds to the 304th to the 2351th bytes of FIG. 2A and describes the recordable part of the user area.

When the mini disk player records data on the disk, first, the value in the square bracket of P-FRA is checked for recognizing the start address of the freely recordable area using the UTOC. As an example, the value of [00] indicates 76th×4 byte and 77×4 byte. As shown in FIG. 2A, UTOC shows the pointer values only to P-TNO 255.

Even though there is recordable area after data is recorded from track 1 to track 255, the disk cannot be used for data recording since the UTOC shown in FIG. 2A provides information related with 255 tracks. Thus, one recorded track should be erased for recording data. Here, the re-recording is performed in only the empty track and cannot be performed in the tracks following the empty track. That is, all tracks should be erased for re-recording.

When the audio data is recorded in 255 tracks of disk shown in FIG. 3, that is, when only half the disk capacity is used for recording, the unused disk area is wasted since the UTOC table shown in FIG. 1B cannot provide information about the unused disk area, that is, the track cannot be allocated to the unused disk area.

SUMMARY OF THE INVENTION

To solve the above problem, it is an object of the present invention to provide a method for restoring an unused area of a disk.

To achieve the above object, a method for restoring the unusable area of a disk having a plurality of tracks (N) to be used for recording and reproducing, wherein the method comprises the steps of:

(a) erasing data of an arbitrary track (X) among said N tracks;

(b) shifting data of a track (X+1) to said track (x);

(c) reforming information of said tracks (X) and (X+1);

(d) determining whether said track (X+1) is said track N;

(e) incrementing X by one if said track (X+1) is not determined to be said track N in the determining step (d);

(f) repeating steps (b) through (e) until said track (X+1) is determined to be said track N in the determining step (d);

(g) making a new last track of said disk by combining an empty area of track N and an unused area if said track (X+1) is determined to be said track N in the determining step (d) and reforming again information of said new last track; and (h) recording the track information reformed through said steps (c) and (g) in a user table of contents of said disk.

BRIEF DESCRIPTION OF THE DRAWINGS

The above objects and advantages of the present invention will become more apparent by describing in detail a preferred embodiment thereof with reference to the attached drawings in which:

FIGS. 1A to 1C are track distribution diagrams for illustrating the unused disk area of an edited mini disk according to the prior art;

FIGS. 2A and 2B show the sector structure of the mini disk developed by Sony;

FIG. 8 shows the UTOC data format structure when one track is erased; and

FIG. 9 shows a final reformed UTOC data format structure stored in the user data area of RAM.

DETAILED DESCRIPTION OF THE INVENTION

Figure 4:
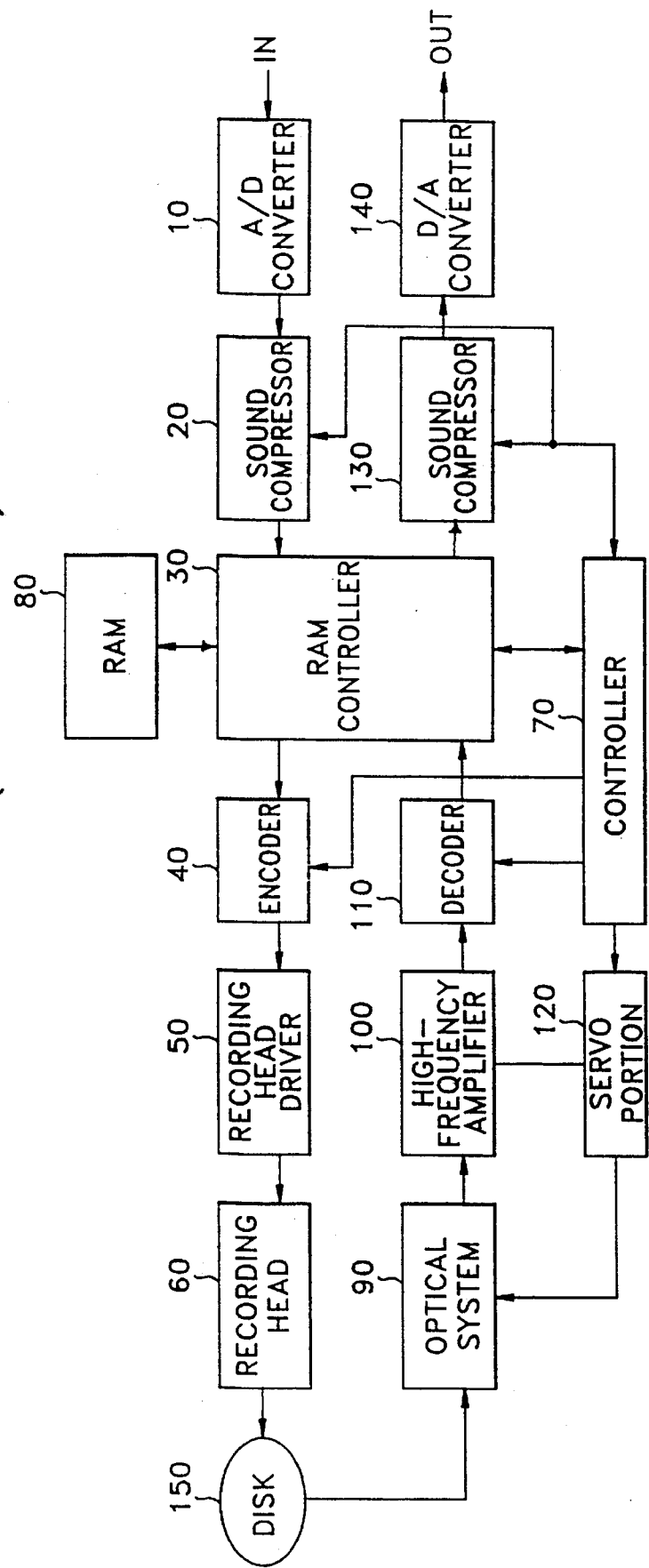
FIG. 4 is a block diagram of a conventional mini disk player, for illustrating the method for restoring the unused area according to the present invention.

In FIG. 4, the disk player comprises an analog-to-digital (A/D) converter 10, a sound compressor 20, a RAM controller 30, an encoder 40, a recording head driver 50, a recording head 60, a controller 70, a RAM 80, an optical system 90, a high-frequency amplifier 100, a decoder 110, a servo portion 120, a sound decompressor 130 and a digital-to-analog (D/A) converter 140. Here, the disk player is composed largely of a recording system and a playback system, the recording system including elements 10, 20, 30, 40, 50, 60, 70 and 80, and the playback system including elements 30, 70, 80, 90, 100, 110, 120 and 130. Also, reference numeral 150 represents a disk.

The operation of disk player shown in FIG. 4 will be described as follows.

In a recording mode, an analog audio signal is input to an input terminal and then converted into a digital signal by A/D converter 10. The data converted into the digital signal is compressed by sound compressor 20. The compressed data is applied to RAM controller 30 and is stored in RAM 80 by controller 70. After the stored data is applied to encoder 40 via RAM controller 30, the data is modulated and recorded in disk 150 via recording head driver 50 and recording head 60.

In a playback mode, controller 70 controls servo 120 so that the data is read out from a designated position of disk 150 via optical system 90, and the read-out data is applied to high-frequency amplifier 100. The amplified data is applied to decoder 110 to be decoded and error-compensated, and the result is output. The output data is applied to RAM controller 30 and is stored in RAM 80 by the control of controller 30. The stored data is applied to sound decompressor 130 to be decompressed via RAM controller 30. The decompressed data is input to D/A converter 140 and is converted into an analog signal to be output.

The method for restoring the unusable area using the disk player according to the present invention will be described below.

Figure 5:
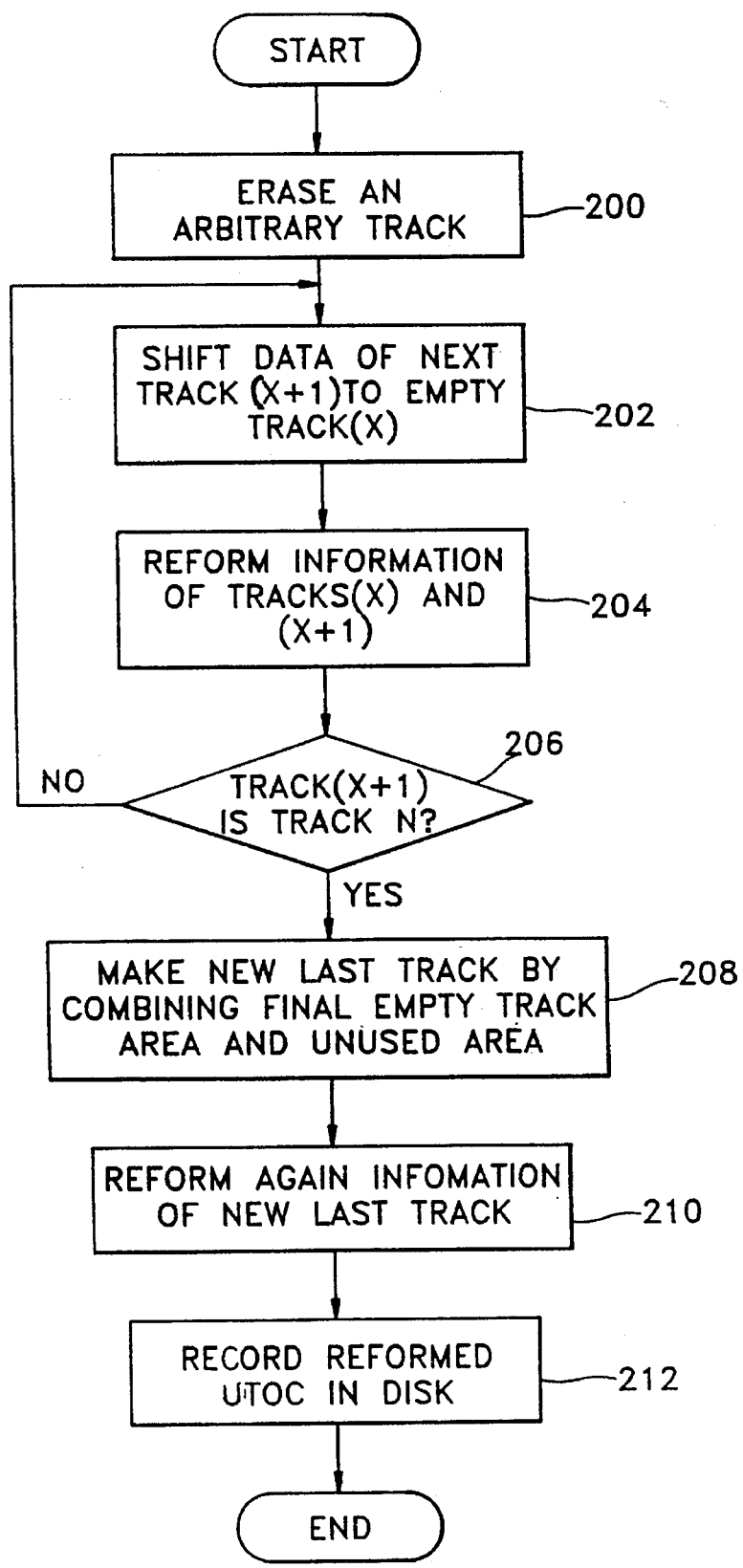
FIG. 5 is a flowchart for illustrating the method for restoring the unused area, performed by the disk player according to the present invention.

If the number of unused tracks is 255, the audio data signal input is recorded in the disk. Controller 70 erases one arbitrary from 255 tracks if the track number of data tracks is 255 (step 200 of FIG. 5). Then, controller 70 reinforms the UTOC data format as shown in FIG. 8.

Supposing that track 2 is selected as the erased track, track 2 (X) becomes an empty track and then the data recorded in track 3 (X+1) is shifted to track 2 (step 202).

Figure 6:
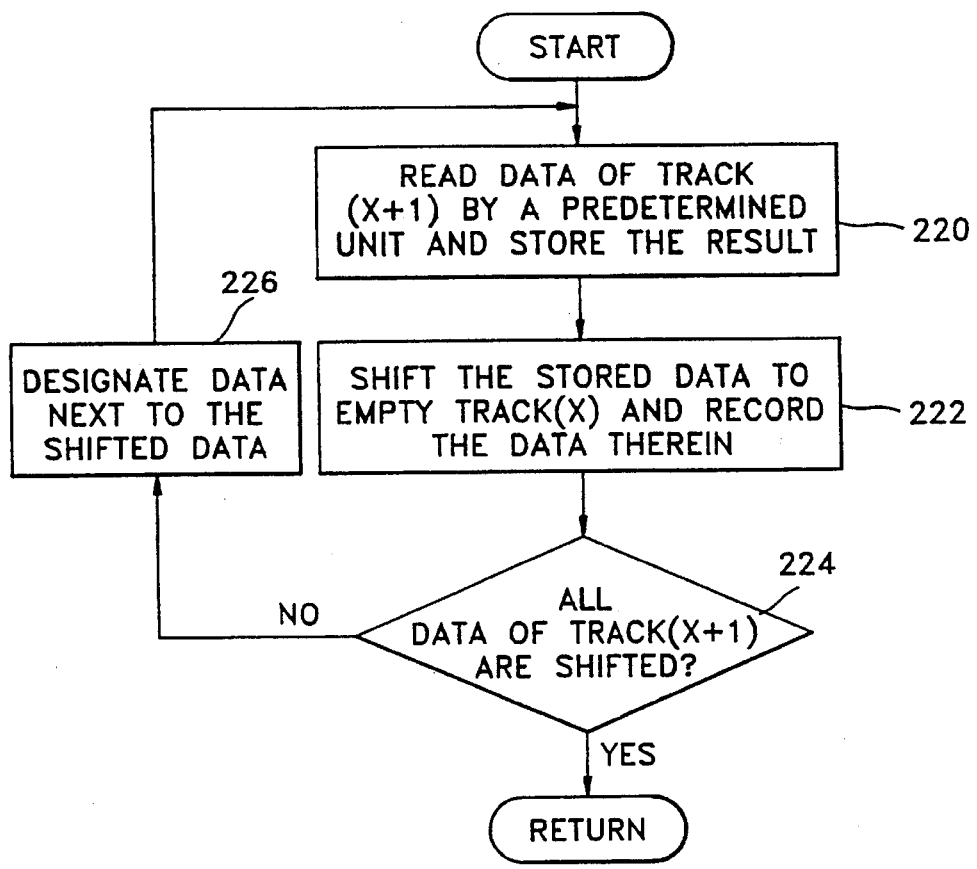
FIG. 6 is a flowchart for illustrating in detail the step 202 shown in FIG. 5.

Referring to FIG. 6, the step 202 will be described in detail.

Controller 70 stores the start address of track 2 in RAM 80 and controls servo portion 120 by increasing the track number by one, so that the data recorded in track 3 is read out by a cluster via optical system 90. Then, the read data is input to RAM controller 30 via high-frequency amplifier 100 and decoder 110. RAM controller 30 stores the data output from decoder 110 and read out from track 3 in a cluster unit in RAM 80 under the control of controller 70 (step 220).

After step 220, controller 70 records the data in a cluster unit read from track 3 in the empty area of the recording start address of track 2 (step 222).

After step 222, controller 70 determines whether all data recorded in track 3 are completely shifted (step 224). If the data shift is not completed, the address of the empty area in track 2 is increased by one, to be set as an address for recording data of track 3, and again the address of the track to be shifted is increased by one. Here, it is repeated that the data of one cluster is stored in the RAM 80 of FIG. 4 and then shifted to the empty area and recorded therein. That is, controller 70 determines an address of the data to be shifted after the data recorded in track 3 is shifted, designates one cluster data of the determined address (step 226) and stores the data in RAM 80. The data stored in RAM 80 is recorded in the address next to the data recorded from the start address of track 2. If all data of track 3 are completely shifted, track information about the address shifting is reflected on the Table. That is, the start and end addresses are reformed as the shifted address and then reflected on the Table. That is, UTOC information related with tracks 2 and 3 is reformed under the control of controller 70 (step 204) and then stored in the user data area of RAM.

Figure 7A:
FIGS. 7A and 7B are track distribution diagrams when an arbitrary track is erased.
Figure 7B:

The above steps are repeated until the data of track 255 shown in FIG. 7A is shifted to track 254 shown in FIG. 7B under the determination of controller 70. FIGS. 7A and 7B are diagrams schematically showing the data shifting. Here, the shifting of the data is represented with arrows.

Controller 70 determines whether the data is completely shifted to the last track and whether track (X+1) is track N. If the data is not completely shifted to the last track, step 202 is performed (step 206).

If the data of track 255 shown in FIG. 7A is finally shifted to track 254 shown in FIG. 7B, the area occupied by the data in track 255 becomes empty and then the empty area is included in the unused area, to thereby reform the area as a new final track of the disk (steps 208 and 210).

That is, if the data is shifted to the last track, the end address of the last track, that is, track 254 shown in FIG. 7B, is stored. When the rearrangement of disk 150 is completed, the value of P-FRA is "03" as shown in FIG. 9. Also, if the tracks from P-TNO 1 to P-TNO 254 are significant tracks, P-TNO 255 is made into the track for re-recording. As a result, the rearrangement of the tracks is completed and then the empty area is shifted to the most rear portion of disk 150. Here, in order to make useful the rear portion of disk 150, the end address of the last track, that is, track 254 shown in FIG. 7B, is made into a start address from which recording is started by increasing the address by as much as one cluster. The position indicated by P-FRA[03], that is, start address of the 82nd byte, is stored in RAM 80 as a recording start address and the reading-out start address of disk 150 is made into a recording end address by reducing the address by as much as one cluster.

Thereafter, the recording start and end addresses indicated by P-FRA[03] are reformed and the result is stored in the user data area of RAM 80 (step 210).

Since the reformed UTOC is stored in the user data area of RAM 80, controller 70 records the reformed UTOC in the UTOC area of disk 150 (step 212).

Figure 3:
FIG. 3 is a track distribution diagram for illustrating the unused area generated when the data is recorded on the mini disk according to the conventional method.

According to the above steps, P-FRA read for searching a recording position on recording is converted, to recognize new usable area of the disk, so that the unused area (FIG. 3) is restored.

Therefore, according to the method for restoring unused area using the disk player of the present invention, the unused area generated due to the limitation of track information provided from the UTOC can be used for re-recording, so that the disk can be used more efficiently.

What is claimed is:

1. A method for restoring an unused area of a disk, the disk having a plurality of tracks sequentially numbered from 1 to N to be used for recording and reproducing, and having a user table of contents for storing information relating to each of the plurality of tracks, the method comprising the steps of:

(a) erasing data of an arbitrary track (X) among said plurality of tracks;

(b) shifting data of a track (X+1) to said track (X);

(c) reforming table of contents information of said tracks (X) and (X+1);

(d) determining whether said track (X+1) is said track N;

(e) incrementing the value of X by one if said track (X+1) is not determined to be said track N in the determining step (d)

(f) repeating steps (b) through (e) until said track (X+1) is determined to be said track N in the determining step (d);

(g) reforming the information of said track N to incorporate an area of said track N from which data has been shifted during any of said steps (b) through (h) and an area of said track N which is unused at the time said step (a) is performed if said track (X+1) is determined to be said track N in the determining step (d); and (h) recording the track information reformed through said steps (c) and (g) in the user table of contents of said disk.

2. A method for restoring an unused area of a disk as claimed in claim 1, wherein said step (b) comprises the steps of:

reading out data of said track (X+1) in a predetermined unit and storing the read data;

shifting said stored data to said track (X) by recording the stored data onto said track (X);

determining whether all data of said track (X+1) are shifted to said track (X) and performing said step (c) if all data of said track (X+1) are shifted to said track (X); and designating data, having an address sequence which continues the address sequence of the data last previously shifted from said track (X+1), as data to be next shifted if it is determined in said determining step that all data of said track (X+1) are not shifted completely to said track (X).

* * * * *